United States Patent [19]

Werner

[11] Patent Number: 5,413,209
[45] Date of Patent: May 9, 1995

[54] LIVE ROLLER CONVEYOR PULLEY FOR IMPROVING THE TRAINING OF A CONVEYOR BELT

[75] Inventor: Hans Werner, King City, Canada

[73] Assignee: Werner Motor Company Ltd., Concord, Canada

[21] Appl. No.: 207,188

[22] Filed: Mar. 8, 1994

[51] Int. Cl.6 .............................................. B65G 45/02
[52] U.S. Cl. ................................. 198/500; 198/788; 384/465
[58] Field of Search ........................ 198/500, 501, 788; 384/465, 472

[56] References Cited

U.S. PATENT DOCUMENTS

| | | | |
|---|---|---|---|
| 1,820,985 | 9/1931 | McKee | 198/788 |
| 2,966,078 | 12/1960 | Wright | 198/500 X |
| 4,082,180 | 4/1978 | Chung | 198/788 X |

Primary Examiner—Cheryl L. Gastineau
Attorney, Agent, or Firm—Ivor M. Hughes; Neil H. Hughes; Marcelo K. Sarkis

[57] ABSTRACT

A motorized conveyor roller is provided which includes a mechanism for rotatably mounting a roller tube in a conveyor frame, the roller tube having a length, an inner diameter and a hollow interior. The roller tube has disposed within the hollow interior, a motor and a gear reducer also mounted inside the roller tube operatively connected to the motor. The gear reducer includes an output and a drive member being driven by the gear reducer output to drive said roller. A lubricant is contained within the hollow interior for lubricating and cooling the motor, the gear reducer, the gear reducer output, and the inner diameter of the roller tube. The roller tube has a device for ensuring that the lubricant is uniformily distributed about the inner diameter and length of the roller tube proximate portions of the inner diameter which do not contain the motor, the gear reducer, or the gear reducer output. The temperature of the lubricant and the roller tube across the length of the roller tube is significantly reduced, and substantially uniform as a result of the conveyor roller design.

9 Claims, 3 Drawing Sheets

5,413,209

LIVE ROLLER CONVEYOR PULLEY FOR IMPROVING THE TRAINING OF A CONVEYOR BELT

FIELD OF THE INVENTION

This invention relates to live conveyor belt pulleys which contain within an internal hollow a motor and gear reducer which are cooled by a lubricating oil contained within the hollow.

BACKGROUND OF THE INVENTION

It is known in the art to manufacture live conveyor roller pulleys substantially as shown in FIG. 1. In order to lubricate the motor and the gears in FIG. 1, a lubricant 100 is provided within the hollow of the pulley. However, in the space away from the motor and gear reducers, it has been found that the oil does not uniformly extend about the interior diameter and length of the pulley when the pulley is traveling at speeds less than the minimum speed (estimated to be approximately 0.75 meters per second) required to force the lubricant by centrifugal force against the inside wall of the pulley. Typically pulleys driving conveyor belts in supermarkets operate at 0.19 meters per second.

In use it has been found that the temperature of the pulley on the outside diameter of the roll tube is hottest in the location of the motor and gears and coolest at the other end of the pulley. The lubricant in the area where the motor and the gear reducers are not contained, stays relatively stationary at the bottom of the pulley at a speeds below 0.75 meters per second, as shown in FIG. 1.

It has been found that conveyor belts running around such pulleys as described above, are continually in need of adjustment as they tend to go out of alignment easily. For example, a conveyor belt running around a pulley as illustrated in FIG. 1, will tend to stretch or expand around the perimeter of the pulley proximate end A in relation to end B. It has been determined that the conveyor belt in fact has much of the heat generated by the pulley, passed on to the material making up the conveyor belt. Therefore a conveyor belt running around area A will tend to stretch because of the increased heat available to the conveyor belt at end A in relation to end B. The conveyor belt will then have a tendency to go easily out Of alignment because of the temperature differential across the conveyor belt.

It will therefore be advantageous to provide a live conveyor pulley which would have a uniform temperature distribution across the length thereof, to ensure in use that the conveyor belt would have substantially the same temperature across its width during start up of the conveyor belt and during the continued operation of the conveyor belt. Such an advantage would result in an overall lower temperature on the pulley surface and belt, less adjustment of the belt and would result in a longer life for the conveyor belt.

To the best of Applicant's knowledge, nowhere in the prior art is there found a device for ensuring the uniform temperature distribution of the conveyor roller and hence the conveyor belt.

It is therefore a primary object of this invention to provide a live pulley for a conveyor belt which provides for the substantial uniform distribution of the temperature across the ends of the pulley.

It is a further object of this invention to provide various mechanisms which will accomplish the primary object of the invention, which may be contained within the drive pulley.

Further and other objects of the invention will become apparent to those skilled in the art when considering the following summary invention and the more detailed description of the preferred embodiments illustrated herein.

SUMMARY OF THE INVENTION

According to one aspect of the invention there is provided a motorized conveyor roller comprising: means for rotatably mounting a roller tube in a conveyor frame, the roller tube having a length, an inner diameter and a hollow interior, the roller tube having disposed within the hollow interior, a motor and a gear reducer also mounted inside the roller tube operatively connected to the motor, said gear reducer including an output means; a drive member being driven by the gear reducer output means to drive said roller, a lubricant contained within the hollow interior for lubricating and cooling the motor, the gear reducer, the gear reducer output means, and the inner diameter of the roller tube, the roller tube having means for ensuring that the lubricant is uniformly distributed about the inner diameter and length of the roller tube proximate portions of the inner diameter which do not contain the motor, the gear reducer, or the gear reducer output means, whereby the temperature of the lubricant and the roller tube across the length of the roller tube is significantly reduced, and substantially uniform.

In one embodiment the motorized conveyor roller including said means for ensuring that the lubricant is uniformly distributed about the inner diameter and length of the roller tube proximate portions of the inner diameter which do not contain the motor, the gear reducer, or the gear reducer output means, is engaged with a stationary shaft disposed within the hollow interior of the roller tube and preferably wherein said means for ensuring that the lubricant is uniformly distributed about the inner diameter and length of the roller tube is clipped onto the stationary shaft.

According to another aspect of the invention there is provided a motorized conveyor roller comprising: means for rotatably mounting a roller tube in a conveyor frame, the roller tube having two ends, a length, an inner diameter and a hollow interior providing a first section and a second section, the roller tube having disposed within the first section of the hollow interior disposed proximate one end of the roller tube, a motor and a gear reducer, mounted on a stationary shaft, the gear reducer being disposed adjacent said motor and operatively connected to the motor, said gear reducer including an output; a drive member being driven by the gear reducer output to drive said roller tube, a lubricant contained within the first and second section of the hollow interior for lubricating and cooling the motor, the gear reducer, the gear reducer output means, and the inner diameter of the roller tube, the second section of the hollow interior of the roller tube being defined by the end of the roller tube remote said first section of the roller tube and the first section of the roller tube, the second section of the roller tube having compressible insert means disposed therein which engages with the inner diameter of the roller tube when inserted therein and which substantially remains in place as the compressible insert means presses again the interior diameter of the roller tube, the compressible insert means for ensuring that the lubricant is uniformly distributed about the inner diameter and length of the second section of the roller tube which does not contain the motor, the gear reducer, or the gear reducer output means, whereby the temperature of the lubricant and the roller tube across the length of the roller tube is significantly reduced, and substantially uniform.

In one embodiment said compressible insert means is a single sheet of material bent to form at least two sides which when compressed will fit within the hollow interior of the roller tube. Preferably said material bent to form at least two sides which when compressed will fit within the hollow interior of the roller tube is a ferrous material such as carbon steel or spring steel. Alternatively said material bent to form at least two sides which when compressed will fit within the hollow interior of the roller tube is a non ferrous material such as tin, brass, copper or aluminum, or the like.

In yet another embodiment said compressible insert means is a molded plastic member which when compressed will fit within the hollow interior of the roller tube which may be an extruded or molded plastic member which when compressed will fit within the hollow interior of the roller tube.

BRIEF DESCRIPTION OF THE DRAWINGS

The invention will now be illustrated with respect to the following drawings illustrating embodiments of the invention in which:

FIGS. 5 is another alternative embodiment of the invention formed by gluing, welding or the like.

DETAILED DESCRIPTION OF PREFERRED EMBODIMENTS OF THE INVENTION

Figure 1:
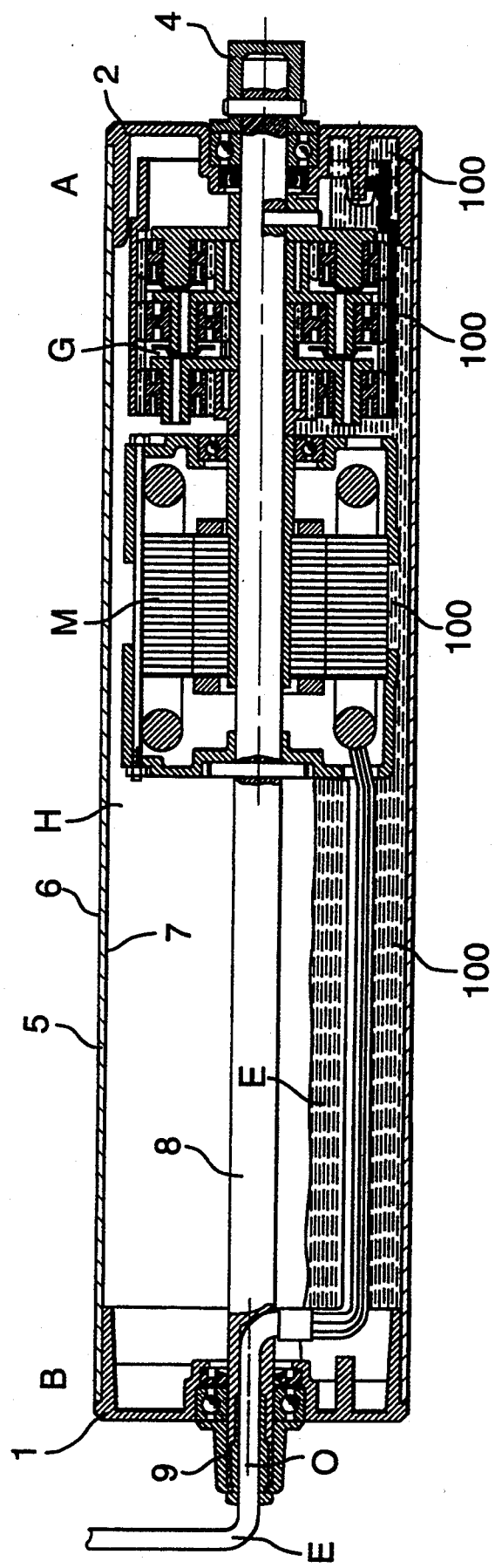
FIG. 1 is prior art to the present invention.

Referring to FIG. 1, there is illustrated a known live conveyor pulley including a motor M which remains stationary on shaft 8, a gear system G, end caps 4 and 9 for mounting the pulley in a conveyor frame, a roll tube 5 having an outer diameter 6 and a inner diameter 7, a shaft 8 extends between end caps 4 and 9 which extend over the ends of the shaft 8. The shaft 8 includes an opening O wherein an electrical feed E is contained which carries the electric supply to the motor M. The gear mechanism G is used to drive the roll tube 5 in a known manner but not the shaft 8 which remains stationary. Within the area H of the pulley is a lubricant 100 which is in engagement with the motor M and the gears G to lubricate the gears and motor and keep them cool. However at speeds below 0.75 meters/sec (the range in which supermarket conveyors typically operate), the lubricant does not coat the internal diameter 7 of the pulley 5 at zone H, and it has been determined that the temperature at end A of the pulley is considerably higher than the temperature at end B of the pulley, there being at times a differential of 20° centigrade wherein end A is approximately 45° centigrade and end B is approximately 22° centigrade when a conveyor belt is in operation. This differential in temperature across the pulley provides a problem with conveyor belts and their continual need for adjustment, since having the temperature varying across the conveyor belt results in a tendency for the belt to want to wander or move toward the cooler side of the belt. Further, if a conveyor belt experiencing the difficulty of movement is adjusted when the conveyor belt is warm and in operation, when it is shut down for the night and started again in the morning, the conveyor will initially have a substantially uniform temperature across the belt, which will therefore require re-adjustment of the belt both in the morning and once the belt warms up on the one side A of the pulley.

Figure 2:
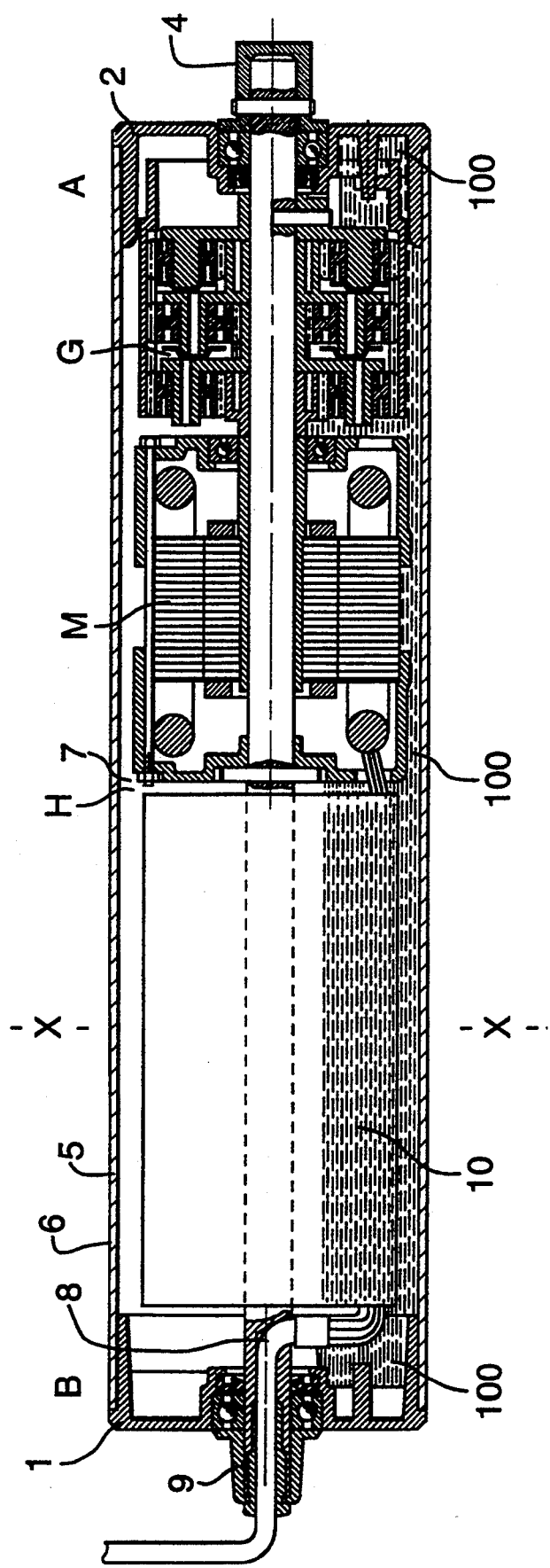
FIG. 2 a longitudinal cross section view of a pulley construction illustrated in a preferred embodiment of the invention.
Figure 3:
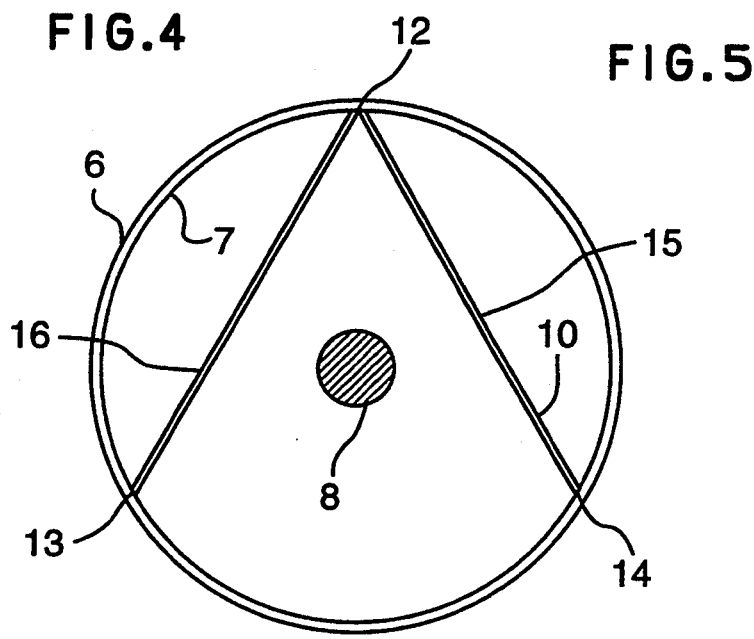
FIG. 3 is a cross section schematic view of the pulley through the line xx of FIG. 2 illustrating a preferred embodiment of the insert described in FIG. 2.

Referring to FIG. 2, there is illustrated a substantially identical pulley to that illustrated in FIG. 1, with the exception that an insert 10 has been inserted within the hollow section of the pulley H. A preferred embodiment of the insert 10 is best seen in FIG. 3 in conjunction with FIG. 2, wherein a bent piece of carbon steel sheet material is inserted within the hollow H. The carbon steel material 10 therefore is formed with 2 legs 15 and 16, which meet at a bend 12 and which extend from 12 to free ends 13 and 14 respectively. The material is sized to require compression of the legs 15 and 16 towards each other when the insert 10 is inserted within the hollow H. The compression results in the ends 12, 13 and 14 pressing against the interior wall 7 of the roll tube 5. The insert 10 is therefore positioned so that the legs or wings 16 and 15 act as vanes to carry the lubricant around the interior 7 of the pulley near the hollow H.

In operation therefore it has been found that a uniform or substantially uniform temperature of 10° centigrade over ambient temperature is achieved across the width of the pulley of FIG. 2 between ends A and B as a direct result of including the insert 10 within the hollow H when the pulley is operated at speeds below those which would cause the lubricant to be forced to the interior wall of tile roll tube 5.

Therefore in operation, the lubricant not only cools the motor M and the gears G but provides a substantially uniform temperature of the exterior of the pulley 5 and the conveyor belt running around the pulley. The net result is that the conveyor belt requires milch less adjustment and when adjusted will not require re-adjustment as often. Start up of the conveyor belt when the belt is uniformly cool will be substantially the same as when the conveyor belt has warmed up uniformly between its edges when running over the pulley of FIG. 2.

Figure 7:
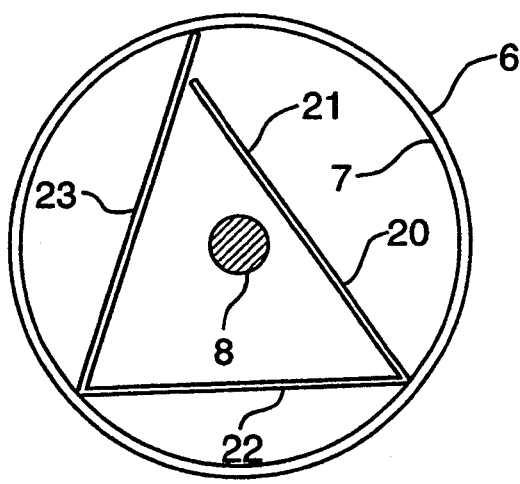
FIG. 7 is an alternative embodiment of the invention to that described in relation to FIG. 3.

Referring to FIG. 7, there is illustrated an alternative embodiment 20 of the spring steel insert 10 of FIG. 3. The spring steel triangular shape element therefore is made up of three sides 21, 22, and 23 around the stationary shaft 8, and provides for again the impeller like movement of the oil about the interior diameter 7 of the pulley 5.

Figure 4:
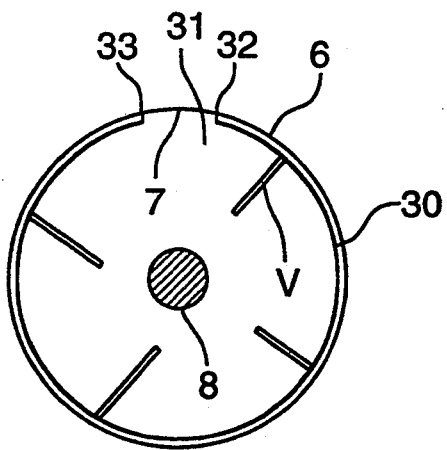
FIG. 4 is an alternative embodiment of the insert of FIG. 3 molded or extruded from plastic material.

Referring to FIG. 4, there is provided an insert 30 which is either an extruded or a molded plastic cylinder shaped insert having a separation 31 between edges 32 and 33, which allows for the compression of the cylinder so as to be inserted within the interior 7 of the hollow pulley 5 in the zone H. Vanes V are provided on the interior diameter of the insert 30 which again act to move the lubricate about the diameter of the pulley H. Many windows or cutouts are provided (not shown) in the cylinder to allow proper lubrication of the wall 7.

Figure 5:
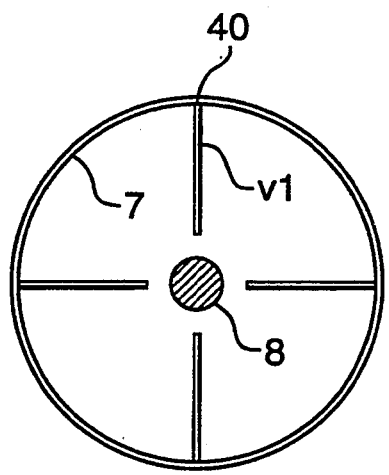

Referring to FIG. 5 there is provided the welding or gluing or the like of vanes V1 positioned by welding or gluing at 40 to the interior wall 7 of the pulley 5.

Figure 6:
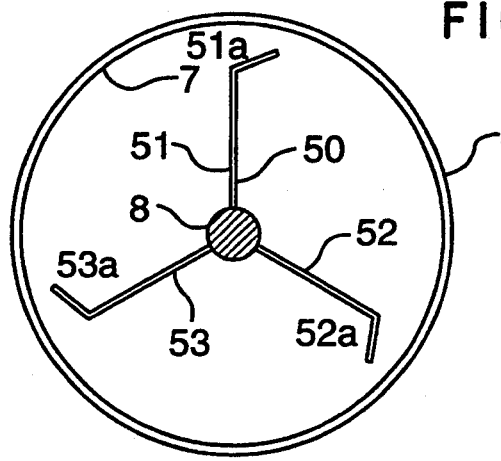
FIG. 6 is a clip on insert illustrated as an alternative embodiment of the invention when the pulley speeds surpass 1.6 m/sec.

Referring to 6, there is provided a clip on device having paddles, the clip on device 50 having legs 51, 52, and 53 with paddles 51a, 52a and 53a for moving the oil about the perimeter of the interior wall 7 of the pulley 5. The form of insert of FIG. 6 is recommended when centrifugal forces, because of the speed of the conveyor pulley causes the lubricant to move outwardly from shaft 8 and as a result of centrifugal forces adheres to the interior 7 of the pulley wall. This has been determined to be at speeds greater than 0.75 meters per second. Therefore at speeds requiring higher revolutions of the pulley it is recommended that structures consider adopting the embodiments similar to FIG. 6.

The structures of FIGS. 4, 5, 3, and 7 are recommended for speeds of less than 0.75 meters per second, and typically 0.19 meters per second, wherein the lubricant does not adhere to the walls 7 by centrifugal force. The numerical values of the speeds are estimates only and are not to be considered as exact. It is recommended that the reader determine these values for themselves based on the required structure of the insert based on the use, the viscosity of the lubricant, the speed of the pulley, the diameter of the pulley etc.

As many changes can be made to the preferred embodiments of the invention without departing from the scope of the invention; it is intended that all material contained herein be interpreted as illustrative of the invention and not in a limiting sense.

The embodiments of the invention in which an exclusive property or privilege is claimed are as follows:

1. A motorized conveyor roller comprising: means for rotatably mounting a roller tube in a conveyor frame, the roller tube having a length, an inner diameter and a hollow interior, the roller tube having disposed within the hollow interior, a motor and a gear reducer also mounted inside the roller tube operatively connected to the motor, said gear reducer including an output means; a drive member being driven by the gear reducer output means to drive said roller tube, a lubricant contained within the hollow interior for lubricating and cooling the motor, the gear reducer, the gear reducer output means, and the inner diameter of the roller tube, the roller tube having means for ensuring that the lubricant is uniformly distributed about the inner diameter and length of the roller tube proximate portions of the inner diameter which do not contain the motor, the gear reducer, or the gear reducer output means, whereby the temperature of the lubricant and the roller tube across the length of the roller tube is substantially uniform.

2. A motorized conveyor roller comprising: means for rotatably mounting a roller tube in a conveyor frame, the roller tube having two ends, a length, an inner diameter and a hollow interior providing a first section and a second section, the roller tube having disposed within the first section of the hollow interior disposed proximate one end of the roller tube, a motor and a gear reducer, mounted on a stationary shaft, the gear reducer being disposed adjacent said motor and operatively connected to the motor, said gear reducer including an output; a drive member being driven by the gear reducer output to drive said roller tube, a lubricant contained within the first and second section of the hollow interior for lubricating and cooling the motor, the gear reducer, the gear reducer output, and the inner diameter of the roller tube, the second section of the hollow interior of the roller tube being defined by the end of the roller tube remote said first section of the roller tube and the adjacent end of first section of the roller tube, the second section of the roller tube having compressible insert means disposed therein which engages with the inner diameter of the roller tube when inserted therein and which substantially remains in place as the compressible insert means presses again the interior diameter of the roller tube, the compressible insert means for ensuring that the lubricant is uniformly distributed about the inner diameter and length of the second section of the roller tube which does not contain the motor, the gear reducer, or the gear reducer output, whereby the temperature of the lubricant and the roller tube across the length of the roller tube is substantially uniform.

3. The motorized conveyor roller of claim 2 wherein said compressible insert means is a single sheet of material bent to form at least two sides which when compressed will fit within the hollow interior of the second section of the roller tube.

4. The motorized conveyor roller of claim 3 wherein said sheet of material is carbon steel.

5. The motorized conveyor roller of claim 3 wherein said sheet of material is aluminum.

6. The motorized conveyor roller of claim 2 wherein said compressible insert means is a molded plastic member which when compressed will fit within the second section of the hollow interior of the roller tube.

7. The motorized conveyor roller of claim 2 wherein said compressible insert means is an extruded plastic member which when compressed will fit within the hollow interior of the roller tube.

8. The motorized conveyor roller of claim 1 wherein said means for ensuring that the lubricant is uniformly distributed about the inner diameter and length of the roller tube proximate portions of the inner diameter which do not contain the motor, the gear reducer, or the gear reducer output means is engaged with a stationary shaft disposed within the hollow interior of the roller tube.

9. The motorized conveyor roller of claim 8 wherein said means for ensuring that the lubricant is uniformly distributed about the inner diameter and length of the roller tube is clipped onto the stationary shaft.

* * * * *